United States Patent
Fuwa et al.

(10) Patent No.: US 8,447,506 B2
(45) Date of Patent: May 21, 2013

(54) TRAVELING DEVICE AND ITS CONTROL METHOD

(75) Inventors: Toshio Fuwa, Nissin (JP); Yushi Takeuchi, Seto (JP); Takashi Izuo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 252 days.

(21) Appl. No.: 12/750,889

(22) Filed: Mar. 31, 2010

(65) Prior Publication Data

US 2010/0268446 A1  Oct. 21, 2010

(30) Foreign Application Priority Data

Apr. 17, 2009  (JP) .................. 2009-100497

(51) Int. Cl.
*G05D 1/08* (2006.01)
(52) U.S. Cl.
USPC .......................................... 701/124
(58) Field of Classification Search
USPC .......................................... 701/124
See application file for complete search history.

(56) References Cited

U.S. PATENT DOCUMENTS

| 6,827,163 B2 * | 12/2004 | Amsbury et al. ............. 180/7.1 |
| 2004/0098185 A1 * | 5/2004 | Wang ............................... 701/70 |
| 2007/0251735 A1 * | 11/2007 | Kakinuma et al. ............. 180/6.5 |

FOREIGN PATENT DOCUMENTS

| JP | 2005-145293 A | 6/2005 |
| JP | 2006-1384 A | 1/2006 |
| JP | 2006-315666 A | 11/2006 |
| JP | 2007-062682 A | 3/2007 |
| JP | 2007-237750 A | 9/2007 |

* cited by examiner

*Primary Examiner* — Thomas Tarcza
*Assistant Examiner* — Maceeh Anwari
(74) *Attorney, Agent, or Firm* — Kenyon & Kenyon LLP (57) ABSTRACT

A traveling device 10 includes ground touching detection means to detect a ground touching state in which a ground touching member touches a road surface, and control means to perform inversion control by controlling the driving of a wheel. When a ground touching state of the ground touching member is detected by the ground touching detection means, the control means suspends the inversion control. Further, when the start of braking is detected by the braking detection means and a ground touching state of the ground touching member is detected by the ground touching means, the control means may suspend the inversion control.

11 Claims, 10 Drawing Sheets

TRAVELING DEVICE AND ITS CONTROL METHOD

INCORPORATION BY REFERENCE

This application is based upon and claims the benefit of priority from Japanese patent Application Publication No. 2009-100497, filed on Apr. 17, 2009, the disclosure of which is incorporated herein in its entirety by reference.

BACKGROUND OF THE INVENTION

1. Field of the Invention

The present invention relates to a traveling device that performs inversion control by controlling the driving of a wheel(s) and its control method, in particular to a traveling device capable of performing more stable traveling and its control method.

2. Description of Related Art

Conventionally, coaxial two-wheeled vehicles that perform inversion control by controlling the driving of a wheel(s) have been known (for example, see Japanese Unexamined Patent Application Publication No. 2006-315666). Further, such coaxial two-wheeled vehicles have a problem that, for example, when the inversion control is stopped due to a malfunction or the like, getting on/off the vehicle becomes very difficult because of its instability. To solve this problem, it is conceivable to take such a countermeasure that a ground touching member such as an assisting wheel is provided in the vehicle, and when the inversion control is suspended, the ground touching member is brought into contact with the ground to stabilize the vehicle.

However, in the case where a ground touching member is provided as described above, when the vehicle accelerates/decelerates by tilting the vehicle itself, for example, the ground touching member could touch the ground and the intended acceleration/deceleration could not be thereby attained. Further, for example, if the ground touching member gets snagged at a step or the like and the inversion control is still continued in that state, an excessive torque is applied to the wheel(s) to restore the vehicle's state from the tiled state, and thus posing a possibility that the wheel(s) could abruptly rotate.

The present invention has been made to solve such problems, and an exemplary object thereof is to provide a traveling device capable of performing more stable traveling and its control method.

SUMMARY OF THE INVENTION

To achieve the above-described object, an exemplary aspect of the present invention is a traveling device including: ground touching detection means to detect a ground touching state in which a ground touching member touches a road surface; and control means to perform inversion control by controlling driving of a wheel; wherein when a ground touching state of the ground touching member is detected by the ground touching detection means, the control means suspends the inversion control. In accordance with this aspect, more stable traveling can be performed.

Further, in this aspect, the traveling device may further include braking detection means to detect the start of the braking of the vehicle, and when the start of braking is detected by the braking detection means and the ground touching state of the ground touching member is detected by the ground touching detection means, the control means may suspend the inversion control. Furthermore, in this aspect, the braking detection means may include an inclination sensor that detects the inclination angle of the vehicle, and the braking detection means may detect the start of the braking of the vehicle based on the inclination angle of the vehicle detected by the inclination sensor. Furthermore, in this aspect, the braking detection means may include a brake switch to start braking, and the braking detection means may detect the start of the braking of the vehicle based on an output signal from the brake switch. Note that in this aspect, the ground touching detection means may include an inclination sensor that detects the inclination angle of the vehicle, and the ground touching detection means may detect the ground touching state of the ground touching member when the inclination angle of the vehicle detected by the inclination sensor becomes a first predetermined angle.

Further, in this aspect, the ground touching detection means may include an inclination sensor that detects the inclination angle of the vehicle, and the control means may suspend the inversion control by changing a gain value of the inversion control according to the inclination angle of the vehicle detected by the inclination sensor. Furthermore, in this aspect, the control means may suspend the inversion control by decreasing the gain value of the inversion control as the ground touching member gets closer to the road surface. Note that in this aspect, a width of a dead band within which the gain value of the inversion control does not change according to the inclination angle of the vehicle may be established, and the control means may change the width of the dead band according to acceleration/deceleration of the traveling device. Note that in this aspect, the control means may suspend the inversion control by changing the gain value of the wheel drive control according to the inclination angle of the vehicle detected by the inclination sensor. Further, in this aspect, the control means may increase the gain value of the wheel drive control and suspend the inversion control as the ground touching member gets closer to the road surface. In this aspect, the ground touching detection means may include a load detection sensor that detects a load exerted on the ground touching member, and the ground touching detection means may detect a ground touching state of the ground touching member based on a load on the ground touching member detected by the load detection sensor.

Further, to achieve the above-described object, another exemplary aspect of the present invention is a control method for a traveling device including: detecting a ground touching state in which a ground touching member touches a road surface; and performing inversion control by controlling driving of a wheel, wherein when a ground touching state of the ground touching member is detected, the inversion control is suspended. In this aspect, the control method for a traveling device may further include detecting the start of the braking of the vehicle, and suspending the inversion control when the start of braking is detected and the ground touching state of the ground touching member is detected.

In accordance with an exemplary aspect of the present invention, a traveling device capable of performing more stable traveling and its control method can be provided.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

[First Exemplary Embodiment]

Figure 1A:
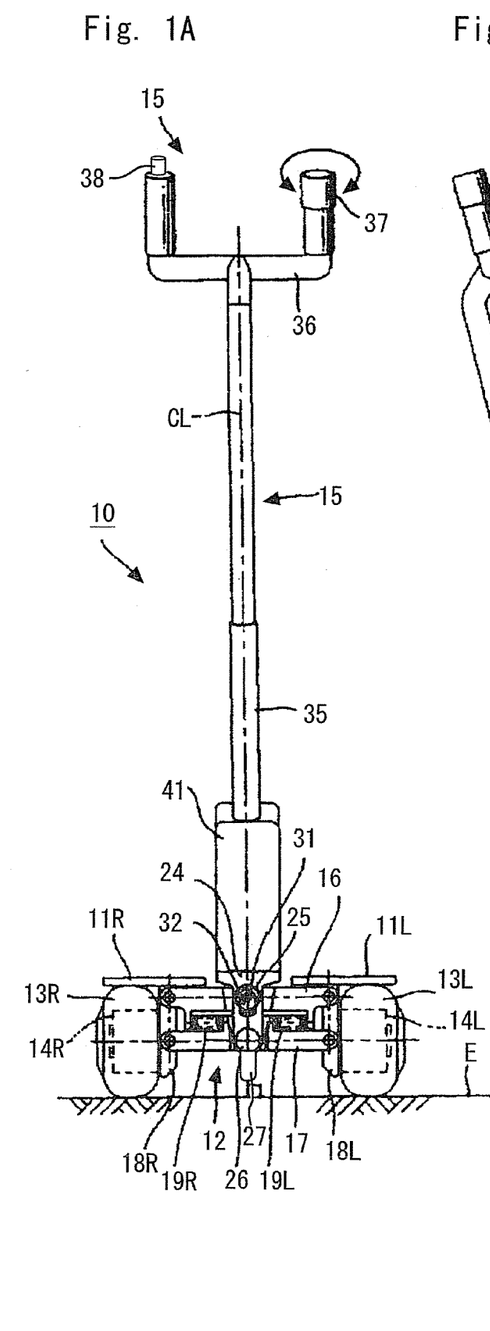
FIG. 1A is a front view showing a structure of a traveling device in accordance with a first exemplary embodiment of the present invention.
Figure 1B:
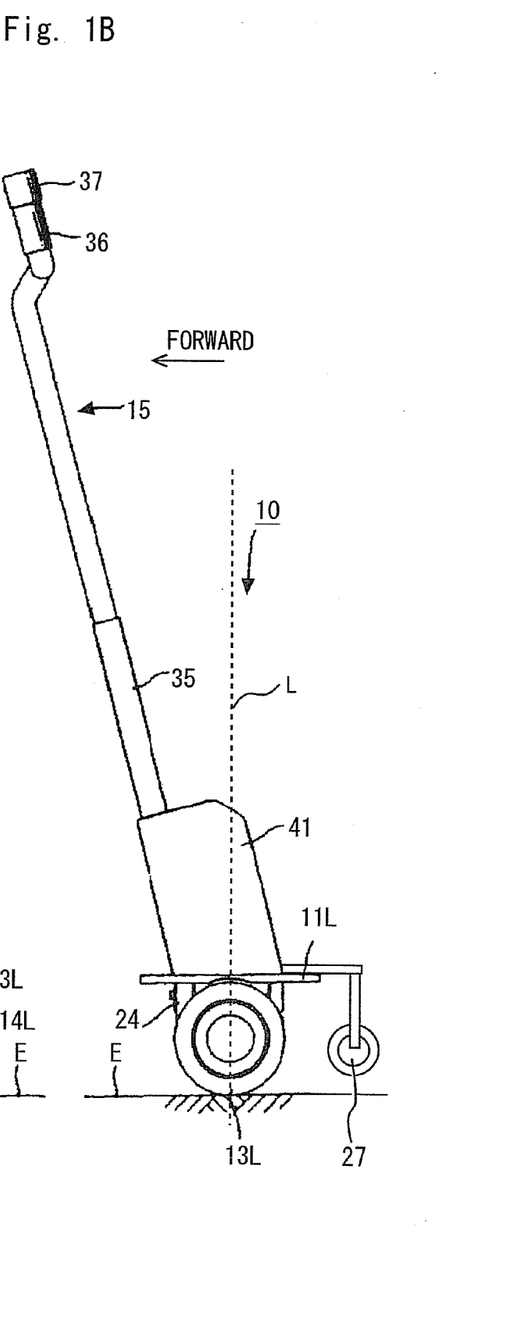
FIG. 1B is a side view showing a structure of a traveling device in accordance with a first exemplary embodiment of the present invention.
Figure 2:
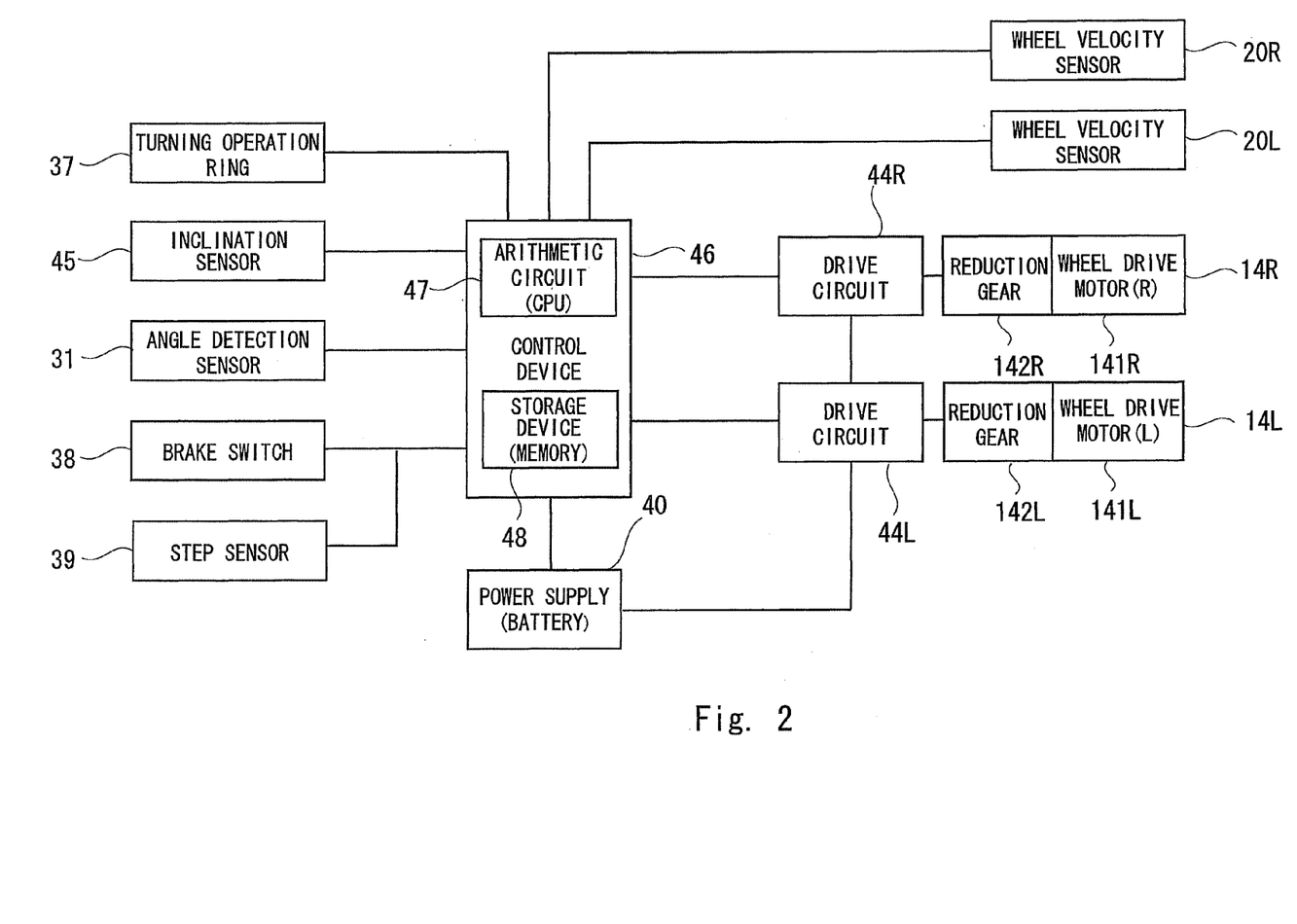
FIG. 2 is a block diagram showing an example of a system configuration of a traveling device in accordance with a first exemplary embodiment of the present invention.

Exemplary embodiments of the present invention are explained hereinafter with reference to the drawings. FIG. 1A is a front view showing a structure of a traveling device in accordance with a first exemplary embodiment of the present invention, and FIG. 1B is a side view showing a structure of a traveling device in accordance with a first exemplary embodiment of the present invention. Further, FIG. 2 is a block diagram showing an example of a system configuration of a traveling device in accordance with a first exemplary embodiment of the present invention.

A traveling device 10 in accordance with a first exemplary embodiment of the present invention is applied to, for example, a coaxial two-wheeled vehicle on which a rider rides in a standing posture. However, it is not limited to such an example, and is applicable to any vehicles that perform inversion control including, for example, a wheelchair type vehicle. As shown in FIGS. 1A and 1B, and FIG. 2, the structure of the traveling device 10 is roughly the same as that disclosed in the above-mentioned Japanese Unexamined Patent Application Publication No. 2006-315666. The traveling device 10 includes a vehicle main body 12, drive wheels 13L and 13R, wheel drive units 14L and 14R, an operation lever 15, an assisting wheel 27, and a control device 46.

The operation lever 15 is an operation portion. By tilting this in the forward/backward direction, the traveling device 10 performs forward traveling or backward traveling. Further, by tilting this in the roll direction, the traveling device 10 performs a turning operation. Note that the roll axis is an axis that passes through the center of the vehicle main body 12 and is in parallel with the traveling direction of the traveling device 10.

The operation lever 15 is fixed to an operation lever bracket 24 at its end portion. Further, the operation lever 15 is composed of a handle post 35 and a handle lever 36 provided on the upper end portion of the handle post 35.

An angle detection sensor 31 is attached to a rotation support shaft 25 of the operation lever 15. For example, a potentiometer, a sensor having a variable-condenser structure, or the like can be used as the angle detection sensor 31. When the operation lever 15 is rotated to a desired direction to which the rider wants to turn by the rider, the angle detection sensor 31 detects its operation amount and operation direction.

The angle detection sensor 31 supplies an operation signal according to the detected operation amount and operation direction to the control device 46. Then, the control device 46 controls the driving of the pair of wheel drive units 14L and 14R according to the operation signal from the angle detection sensor 31, and thereby produces a rotation difference between the left and right drive wheels 13L and 13R. In this way, the traveling device 10 can perform turning traveling in a desired direction at a desired vehicle velocity.

A turning operation ring 37 that is capable of controlling the driving of the pair of wheel drive units 14L and 14R and thereby operating a turning movement of the traveling device 10 is attached on one of the upper end portions of the handle lever 36. The turning operation ring 37, which is used to control a turning movement of the traveling device 10 by a manual operation, serves as an accelerator ring for a turning movement.

The turning operation ring 37 includes a potentiometer or the like embedded therein. When the turning operation ring 37 is rotationally operated to a desired direction to which the rider wants to turn by the rider, the potentiometer or the like detects its operation amount and operation direction. Further, the turning operation ring 37 supplies an operation signal according to the operation amount and operation direction detected by the potentiometer or the like to the control device 46.

The control device 46 controls the driving of the pair of wheel drive units 14L and 14R according to the operation signal from the turning operation ring 37, and thereby produces a rotation difference between the left and right drive wheels 13L and 13R. In this way, the traveling device 10 can perform turning traveling in a desired direction at a desired vehicle velocity.

Wheel velocity sensors 20L and 20R that detect the wheel velocities of the respective wheels 13L and 13R are provided in the left and right drive wheels 13L and 13R respectively. The wheel velocity sensors 20L and 20R output the detected wheel velocities of the respective drive wheels 13L and 13R to the control device 46.

A brake switch 38 that is used to decelerate and stop the traveling device 10 is provided on the other upper end portion of the handle lever 36. The brake switch 38 is a switch that outputs a brake control start signal. The brake control start signal is used as a trigger to cause the control device 46 to perform brake control. Although the brake switch 38 is provided in the handle lever 36, it is not limited to this configuration and the brake switch 38 can be disposed in any position.

When a rider performs a predetermined operation such as pushing down the brake switch 38, the brake switch 38 supplies a brake control start signal to the control device 46. The control device 46 starts to perform braking control to decelerate and stop the traveling device 10 according to the brake control start signal from the brake switch 38.

Note that the control device 46 may also perform getting-off assist control to help a rider to get off the vehicle, in addition to performing the braking control in response to the brake control start signal from the brake switch 38. Further, in this exemplary embodiment, a configuration in which the traveling of the traveling device 10 is operated by operating the operation lever 15, the turning operation ring 37, the brake switch 38, and the like is explained. However, it is not limited to the configuration like this, and other configurations including one in which a traveling device 10 is operated through a given HMI (Human Machine Interface) device, for example, may be also adopted.

The vehicle main body 12 supports the operation lever 15 such that the operation lever 15 can rotate in the roll direction. The pair of drive wheels 13L and 13R are coaxially arranged on both sides of the vehicle main body 12 in the direction perpendicular to the traveling direction of the vehicle main body 12, and rotatably supported in the vehicle main body 12.

Two step portions 11L and 11R are provided on both the left and right sides of the operation lever 15 on the top surface of the vehicle main body 12. The step portions 11L and 11R are steps used by a rider to put each of his/her feet thereon, and are composed of a pair of plate bodies each of which is formed with a size substantially equal to or slightly larger than a human sole.

Step sensors 39L and 39R are provided in the respective step portions 11L and 11R. Each of the step sensors 39L and 39R is composed of, for example, a weight sensor, and detects whether or not a foot of a rider is placed on the respective one of the step portions 11L and 11R. Then, if a foot is placed on the step portions 11L and 11R, the step sensors 39L and 39R supplies a foot detection signal to the control device 46.

The vehicle main body 12 has a parallel link structure described in Japanese Unexamined Patent Application Publication No. 2006-315666. The vehicle main body 12 is constructed as a parallel link mechanism including a vehicle body upper member 16 and a vehicle body lower member 17 that are arranged above and below and in parallel to each other, and a pair of side members 18L and 18R that are arranged left and right of and in parallel to each other and rotatably coupled to the vehicle body upper member 16 and the vehicle body lower member 17.

A ground touching member such as an assisting wheel 27, which is used to stabilize the traveling device 10 by touching the ground, is provided in a rear part of the vehicle main body 12. Although a single assisting wheel 27 is provided in the vehicle main body 12, it is not limited to this example and more than one assisting wheel 27 may be provided. Further, although the assisting wheel 27 is provided in the rear part of the vehicle main body 12, it is not limited to this configuration. For example, the assisting wheel 27 can be provided in any location including a front part, or each of front and rear parts. Further, although the assisting wheel 27 is firmly fixed with respect to the vehicle main body 12, it is not limited to this configuration and the assisting wheel 27 may be movable with respect to the vehicle main body 12. Furthermore, although the assisting wheel 27 is used as the ground touching member, it is not limited to this component. Any component can be used for that purpose, provided that it can stabilize the traveling device 10 by touching the ground.

A pair of coil springs 19L and 19R are interposed between the vehicle body upper member 16 and vehicle body lower member 17 constituting this parallel link mechanism. The coil springs 19L and 19R exert spring forces such that angles formed by the vehicle body upper member 16 and the vehicle body lower member 17 and the pair of side members 18L and 18R are respectively maintained at right angles.

Wheel drive units 14L and 14R are respectively attached on the respective outer surfaces of the pair of side members 18L and 18R. The wheel drive units 14L and 14R can rotationally drive the pair of the drive wheels 13L and 13R independently. These wheel drive units 14L and 14R are constructed, for example, from wheel drive motors 141L and 141R and reduction gears 142L and 142R that are coupled to the rotation shafts of the wheel drive motors 141L and 141R so that the power can be transmitted therethrough.

A battery 40, which is a specific example of a power supply 40 that supplies electrical power to the pair of wheel drive units 14L and 14R, the control device 46, and other electronic devices and the likes, is provided on the top surface of the operation lever bracket 24, which also serves as the base portion of the operation lever 15. The battery 40 is covered with a power-supply cover 41.

Drive circuits 44L and 44R that drive the pair of wheel drive units 14L and 14R are embedded in the housing portion of the vehicle body upper member 16. Further, an inclination sensor 45 that detects the inclination angle θ of the vehicle main body 12 or the operation lever 15, and a control device 46 that outputs a control signal used to perform drive control for the pair of wheel drive units 14L and 14R are provided in the vehicle body lower member 17.

The control device 46 performs predetermined arithmetic processing based on an operation signal from the turning operation ring 37, an inclination angle θ from the inclination sensor 45, an operation signal from the angle detection sensor 31, a brake control start signal from the brake switch 38, a foot detection signal from the step sensor 39, and the like, and outputs a necessary control signal(s) to the pair of wheel drive units 14L and 14R.

As shown in FIG. 2, the control device 46 includes, for example, an arithmetic circuit 47 including a microcomputer (CPU), and a storage device 48 including a program memory, a data memory, and other RAMs and ROMs and the likes.

The battery 40 and the pair of drive circuits 44L and 44R are connected to the control device 46. Further, the pair of drive circuits 44L and 44R are connected to the battery 40. The pair of drive circuits 44L and 44R independently control the rotation velocities, the rotation directions, and the likes of the pair of drive wheels 13L and 13R, and the pair of wheel drive units 14L and 14R are separately connected to the respective drive circuits 44L and 44R.

The inclination sensor 45 can detect, for example, the inclination angle θ (pitch angle) of the vehicle main body 12 or the operation lever 15 while the traveling device 10 is traveling. Further, the inclination sensor 45 is composed of, for example, a gyro sensor, an acceleration sensor and the like. When the operation lever 15 is tilted forward or backward, the step portions 11L and 11R of the vehicle main body 12 will be tilted to the same direction as that of the operation lever 15. The inclination sensor 45 can detect an inclination angle θ corresponding to this tilting. Then, the control device 46 performs drive control for the wheel drive units 14L and 14R based on the inclination angle θ of the vehicle main body 12 or the operation lever 15 detected by the inclination sensor 45 so that the traveling device 10 moves to the direction to which the vehicle main body 12 or the operation lever 15 is tilted.

Figure 3:
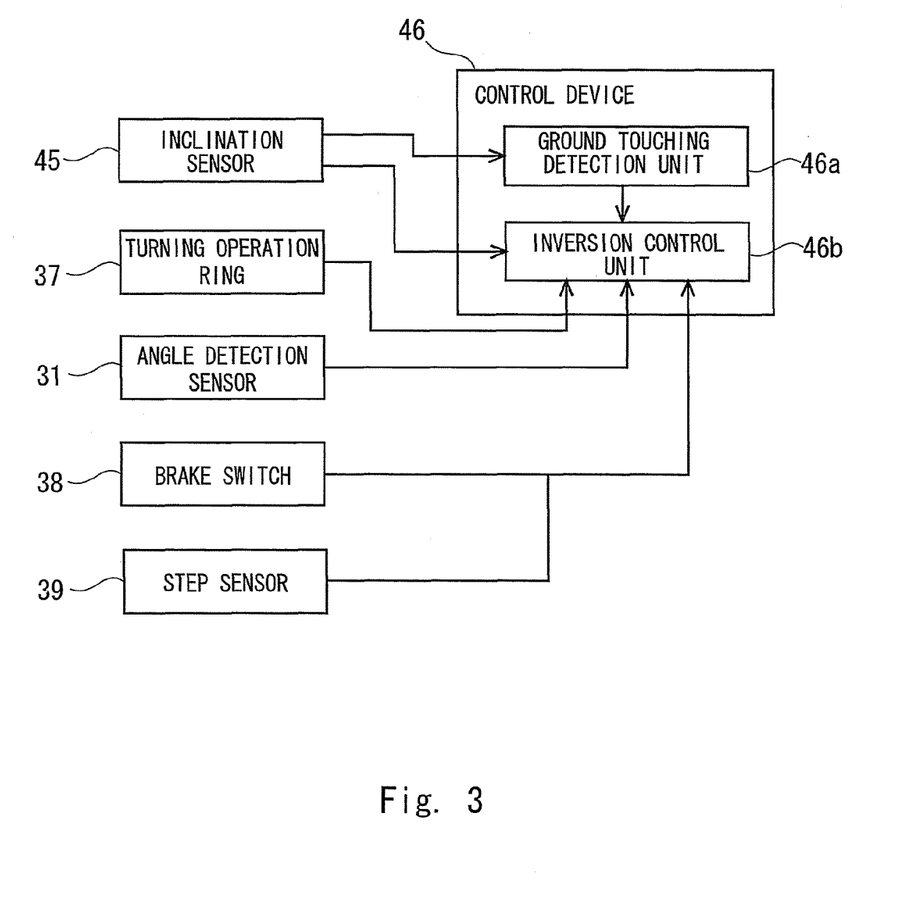
FIG. 3 is a block diagram showing an example of a general system configuration of a control device of a traveling device in accordance with a first exemplary embodiment of the present invention.

FIG. 3 is a block diagram showing an example of a general system configuration of a control device of a traveling device in accordance with the first exemplary embodiment. The control device 46 includes a ground touching detection unit 46a and an inversion control unit 46b.

The ground touching detection unit 46a detects a ground touching state in which the assisting wheel 27 is in contact with the road surface E when the inclination angle θ from the inclination sensor 45 becomes a first predetermined angle $θ_a$. Note that the first predetermined angle $θ_a$ is set to an angle that is obtained in advance, for example, by measuring the inclination angle of the vehicle main body 12 or the operation lever 15 in the situation where the assisting wheel 27 is in contact with the road surface E (FIG. 4C). When the ground touching detection unit 46a detects a ground touching state of the assisting wheel 27, it outputs a detection signal to the inversion control unit 46b. Further, when the inclination angle θ changes from the ground touching state (inclination angle $θ=θ_a$) of the assisting wheel 27 to an angle smaller than or equal to a second predetermined angle $θ_b$ ($θ≦θ_b<θ_a$) and the ground touching detection unit 46a thereby detects a non-ground touching state in which the assisting wheel 27 is not in contact with the road surface E, it output a non-detection signal to the inversion control unit 46b.

Although the ground touching detection unit 46a detects a ground touching state of the assisting wheel 27 based on the inclination angle θ from the inclination sensor 45, it is not limited to this example. Any sensor and method can be used for that purpose, provided that they can properly detect a ground touching state of the assisting wheel 27. For example, a ground touching state of the assisting wheel 27 may be detected based on a load value detected by a load sensor, such as a piezoelectric sensor, provided in the assisting wheel 27. Further, a ground touching state of the assisting wheel 27 may be also detected based on a distance to the road surface E detected by a range sensor such as a laser sensor. Furthermore, a ground touching state of the assisting wheel 27 may be detected by combining the above-mentioned sensors in an arbitrary manner.

Figure 4A:
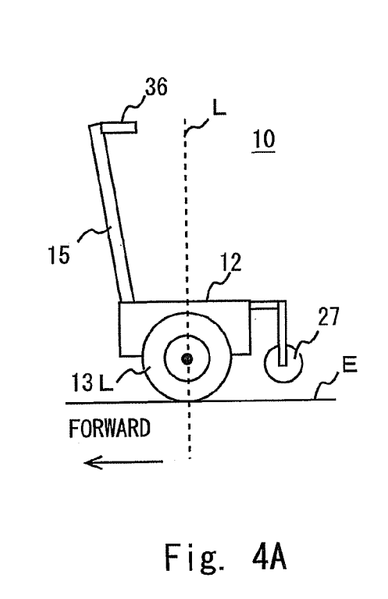
FIG. 4A is a schematic diagram showing an example of a traveling device in an inversion control state.
Figure 4B:
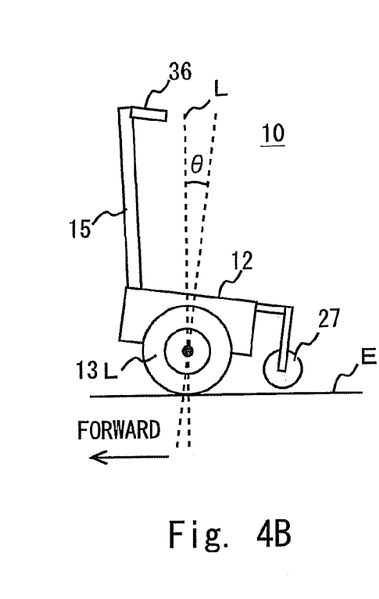
FIG. 4B is a schematic diagram showing an example of a traveling device in an inversion control state.
Figure 4C:
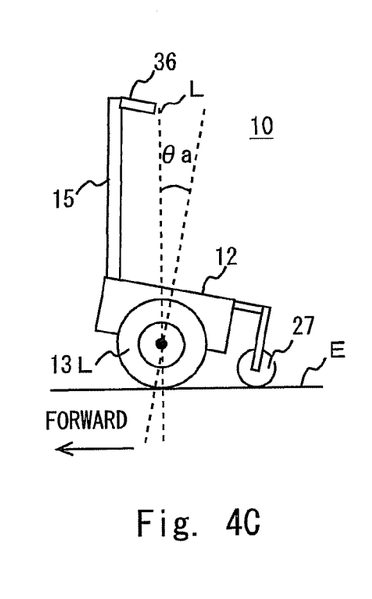
FIG. 4C is a schematic diagram showing an example of a traveling device in a state where an assistant wheel is in contact with the ground.

The inversion control unit (control means) 46b performs inversion control to maintain the inversion state of the traveling device 10 by controlling the drive wheels 13L and 13R (FIG. 4A). The inversion control unit 46b controls the rotational driving of each of the drive wheels 13L and 13R such that, for example, an inclination angle θ formed between a straight line L that extends vertically from a ground touching point at which the drive wheels 13L and 13R of the traveling device 10 touches the road surface E and passes through the axle and a straight line that connects the position of the center of gravity of the traveling device 10 and the axle becomes a target inclination angle $θ_0$ (e.g., $θ_0=0°$)(FIG. 4B). Note that in FIGS. 4A to 4C, as an example, the angle formed when the vehicle main body 12 is in a horizontal state is defined as an inclination angle 0°, and the clockwise direction is defined as a positive direction.

Specifically, the inversion control unit 46b first multiples the inclination angle θ of the vehicle main body 12 detected by the inclination sensor 45 by the gain value G of the inversion control to calculate a rotational torque T ($T=θ×G$) for each of the drive wheels 13L and 13R. Then, the inversion control unit 46b controls each of the wheel drive units 14L and 14R through the drive circuits 44L and 44R so that the calculated rotational torque T is produced in each of the drive wheels 13L and 13R. In this way, the inversion control unit 46b can rotate each of the drive wheels 13L and 13R toward the direction to which the vehicle main body 12 is tilted, and thereby perform inversion control so as to return the position of the center of gravity of the traveling device 10 to the point on the straight line L that passes through the axle of the drive wheels 13L and 13R.

The inversion control unit 46b performs inversion control to maintain the inverted state in which the inclination angle θ formed with respect to the straight line L does not exceeds a certain value by applying appropriate rotational torque T to each of the drive wheels 13L and 13R as described above. Further, in addition to the above-described rotational torque T for the inversion control, the inversion control unit 46b also applies other rotational torques to each of the drive wheels 13L and 13R in order to perform wheel drive control for forward traveling, backward traveling, deceleration, acceleration, right turn, left turn, left rotation, right rotation, and the like according to operation signals from the angle detection sensor 31 and the turning operation ring 37, and the inclination angle θ from the inclination sensor 45. Note that the inversion control unit 46b may perform the above-described rotational torque control for the drive wheels 13L and 13R, for example, by using well-known control methods such as state feedback control and robust control.

Incidentally, in a conventional traveling device, for example, if acceleration/deceleration of the vehicle is performed by tilting the vehicle main body, there is a possibility that the ground touching member comes into contact with the ground or the like and that the intended acceleration/deceleration thereby cannot be attained. Further, if the ground touching member gets snagged at a step or the like and the inversion control is still continued in that state, an excessive torque is applied to the wheel(s) to restore the vehicle's state from the tiled state, and thus posing a possibility that the wheel(s) could abruptly rotate. Therefore, in a traveling device 10 in accordance with this exemplary embodiment, if the inversion control unit 46b receives a detection signal from the ground touching detection unit 46a and determines that the assisting wheel 27 is in contact with the road surface E and thus in a ground touching state, it suspends the above-mentioned inversion control. In this way, the traveling device 10 can perform more stable traveling.

Figure 5:
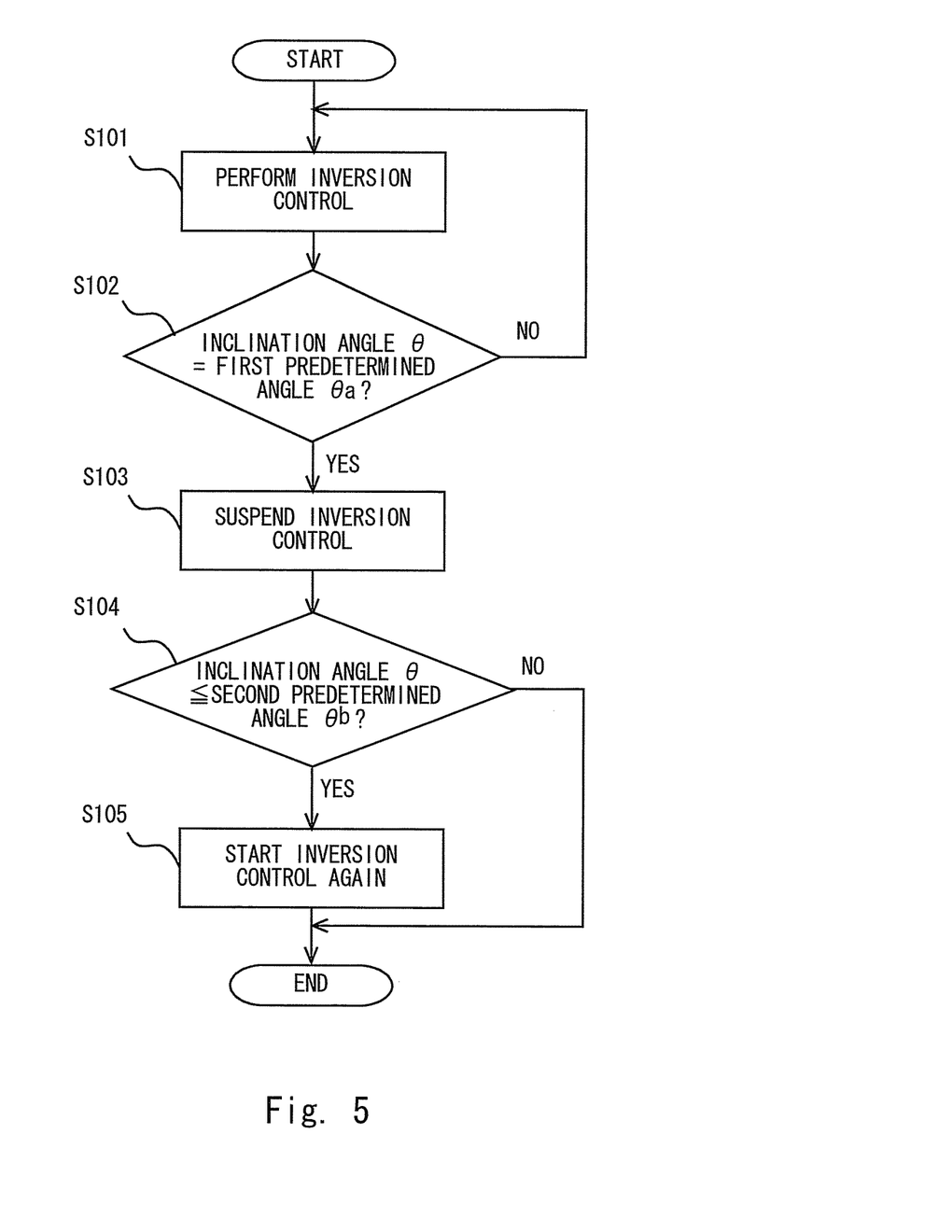
FIG. 5 is a flowchart showing an example of a control process flow of a traveling device in accordance with a first exemplary embodiment of the present invention.

FIG. 5 is a flowchart showing an example of a control process flow of a traveling device in accordance with the first exemplary embodiment of the present invention. Note that a control process shown in FIG. 5 and FIG. 6 (which is described later) is performed repeatedly, for example, at certain time intervals.

For example, the inversion control unit 46b of the control device 46 performs inversion control, while moving the traveling device 10 to the direction to which the vehicle main body 12 or the operation lever 15 is tiled, by performing drive control for the wheel drive units 14L and 14R based on the inclination angle θ of the vehicle main body 12 or the operation lever 15 detected by the inclination sensor 45 (step S101). Further, the ground touching detection unit 46a detects a ground touching state of the assisting wheel 27 in which the inclination angle θ from the inclination sensor 45 becomes the first predetermined angle $θ_a$ ($θ=θ_a$) (step S102).

When the inclination angle θ from the inclination sensor 45 becomes the first predetermined angle $θ_a$ and the ground touching detection unit 46a thereby detects a ground touching state of the assisting wheel 27 (Yes at step S102), it outputs a detection signal to the inversion control unit 46b. Then, when the inversion control unit 46b receives the detection signal from the ground touching detection unit 46a, it suspends the inversion control (step S103) and the process moves a step described below (step S104).

Next, the ground touching detection unit 46a detects a non-ground touching state of the assisting wheel 27 in which the inclination angle θ from the inclination sensor 45 becomes an angle smaller than or equal to the second predetermined angle $θ_b$ ($θ≦θ_b$) (step S104). When the inclination angle θ from the inclination sensor 45 becomes an angle smaller than or equal to the certain angle $θ_b$ and the ground touching detection unit 46a thereby detects a non-ground touching state (Yes at step S104), the inversion control unit 46b starts the inversion control again (step S105) and the control device 46 finishes the control process. On the other hand, when the ground touching detection unit 46a does not detect the non-ground touching state (No at step S104), the control device 46 finishes the control process.

As described so far, in a traveling device 10 in accordance with the first exemplary embodiment, when the inversion control unit 46b receives a detection signal from the ground touching detection unit 46a and determines that the assisting wheel 27 is in contact with the road surface E and thus in a ground touching state, it suspends the above-mentioned inversion control. In this way, the traveling device 10 can travel in a more stable manner by suspending unnecessary inversion control with certainty when the assisting wheel 27 is in a ground touching state.

[Second Exemplary Embodiment]

Figure 6:
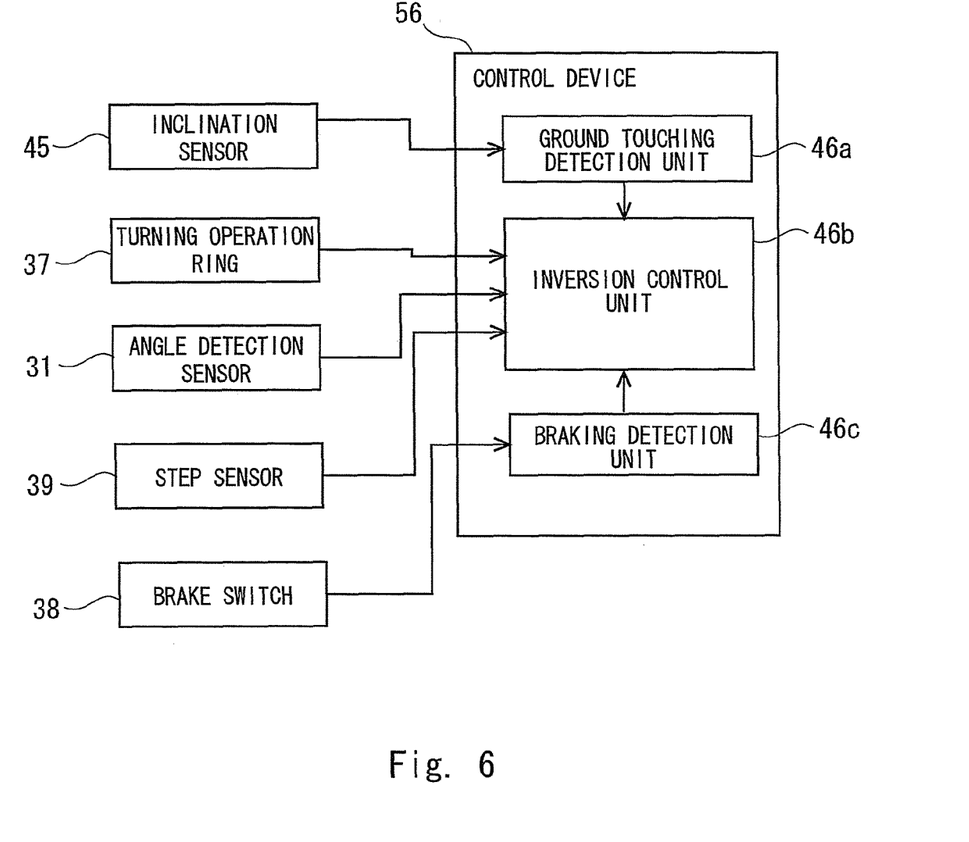
FIG. 6 is a block diagram showing an example of a general system configuration of a control device of a traveling device in accordance with a second exemplary embodiment of the present invention.

A control device 56 of a traveling device 10 in accordance with a second exemplary embodiment of the present invention includes a braking detection unit 46c that detects a braking start trigger in addition to the constituents of the control device 46 of the traveling device 10 in accordance with the first exemplary embodiment (FIG. 6). The braking start trigger indicates a rider's intention for braking.

The braking detection unit 46c can detects a braking start trigger, for example, by receiving a braking control start signal from a brake switch 38. When the braking detection unit 46c detects the start of braking, it outputs a braking instruction signal to the inversion control unit 46b. When the inversion control unit 46b receives a braking instruction signal from the braking detection unit 46c and receives a detection signal from the ground touching detection unit 46a, it suspends the above-described inversion control. Although the braking detection unit 46c detects the start of braking based on a braking control start signal from the brake switch 38, it is not limited to this configuration. The start of braking may be detected by using any given sensor and method. For example, it may be detected based on the inclination angle $\theta$ of the vehicle main body 12 detected by the inclination sensor 45.

In a traveling device 20 in accordance with the second exemplary embodiment, other structures are roughly the same as those of the traveling device 10 in accordance with the first exemplary embodiment. Therefore, the same signs are assigned to the same parts, and their detailed explanation is omitted.

Figure 7:
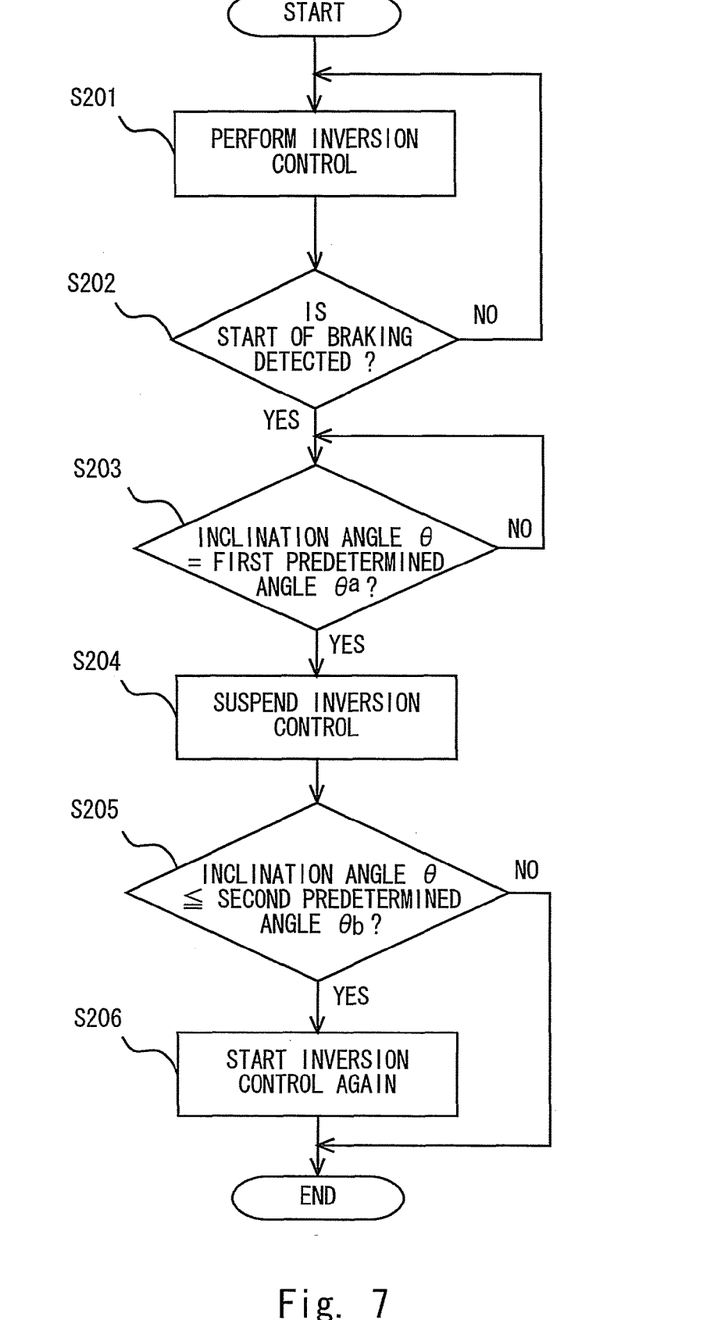
FIG. 7 is a flowchart showing an example of a control process flow of a traveling device in accordance with a second exemplary embodiment of the present invention.

FIG. 7 is a flowchart showing an example of a control process flow of a traveling device 20 in accordance with a second exemplary embodiment of the present invention. For example, the inversion control unit 46b of the control device 56 performs inversion control, while moving the traveling device 20 to the direction to which the vehicle main body 12 or the operation lever 15 is tiled, by performing drive control for the wheel drive units 14L and 14R based on an inclination angle $\theta$ of the vehicle main body 12 or the operation lever 15 detected by the inclination sensor 45 (step S201).

Next, when the braking detection unit 46c receives a braking control start signal from the brake switch 38 and thereby detects the start of baking of the traveling device 20 (Yes at step S202), the ground touching detection unit 46a detects a ground touching state of the assisting wheel 27 in which the inclination angle $\theta$ from the inclination sensor 45 becomes a first predetermined angle $\theta_a$ ($\theta = \theta_a$) (step S203).

When the inclination angle $\theta$ from the inclination sensor 45 becomes the first predetermined angle $\theta_a$ and the ground touching detection unit 46a thereby detects a ground touching state of the assisting wheel 27 (Yes at step S203), it outputs a detection signal to the inversion control unit 46b. Then, when the inversion control unit 46b receives the detection signal from the ground touching detection unit 46a, it suspends the inversion control (step S204) and the process moves a step described below (step S205). At this point, the inversion control unit 46b sets the target velocity of the traveling device 20 to zero based on the braking control start signal, for example, and controls the wheel drive units 14L and 14R so that a rotational torque(s) corresponding to that target velocity is applied to the drive wheels 13L and 13R. Therefore, for example, even when the traveling device 20 is traveling on an inclined road surface, a rotational torque(s) is applied to the drive wheels 13L and 13R so that the above-mentioned target velocity=0 (standstill state) is attained. Therefore, the traveling device 20 can be at a standstill with stability on the inclined surface.

Next, the ground touching detection unit 46a detects a non-ground touching state of the assisting wheel 27 in which the inclination angle $\theta$ from the inclination sensor 45 becomes an angle smaller than or equal to a second predetermined angle $\theta_b$ ($\theta \leq \theta_b$) (step S205). When the inclination angle $\theta$ from the inclination sensor 45 becomes an angle smaller than or equal to the certain angle $\theta_b$ and the ground touching detection unit 46a thereby detects a non-ground touching state (Yes at step S205), the inversion control unit 46b starts the inversion control again (step S206) and the control device 46 finishes the control process. On the other hand, when the ground touching detection unit 46a does not detect the non-ground touching state (No at step S205), the control device 46 finishes the control process.

As described so far, in a traveling device 20 in accordance with the second exemplary embodiment, when the inversion control unit 46b of the control device 56 receives a braking instruction signal from the braking detection unit 46c and receives a detection signal from the ground touching detection unit 46a, it suspends the inversion control. In this way, the traveling device 20 can travel and stop in a more stable manner by suspending unnecessary inversion control with certainty when the traveling device 20 is in a braking state and the assisting wheel 27 is in a ground touching state.

[Third Exemplary Embodiment]

In a traveling device 10, 20 in accordance with a third exemplary embodiment of the present invention, the inversion control unit 46b of the control device 46, 56 may suspend the inversion control by decreasing the gain value G of the inversion control according to the inclination angle $\theta$ of the vehicle main body 12 detected by the inclination sensor 45. The inversion control unit 46b may decrease the gain value G of the inversion control, for example, as the inclination angle $\theta$ from the inclination sensor 45 gradually increases and thus the assisting wheel 27 gets closer to the road surface E (FIG. 8).

Figure 8:
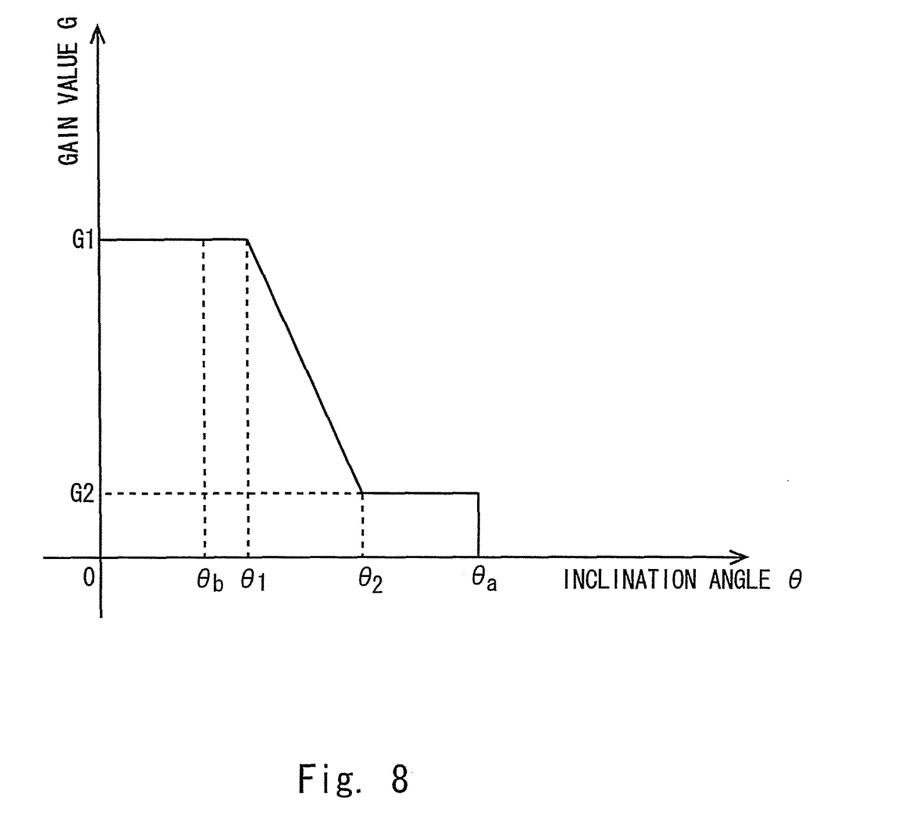
FIG. 8 shows an example of a relation between gain values of inversion control and inclination angles.

For example, as shown in FIG. 8, when an expression $0 \leq$ inclination angle $\theta \leq \theta_1$ is satisfied, the gain value G is fixed at a normal gain value G1 (G=G1). Further, when an expression $\theta_1 \leq$ inclination angle $\theta \leq \theta_2$ is satisfied, the gain value G gradually decreases with a proportionality constant $\alpha$ ($\alpha < 0$) (G=$\alpha \cdot \theta$). Further, when an expression $\theta_2 \leq$ inclination angle $\theta < \theta_a$ is satisfied, the gain value G is fixed at a minute gain value G2 (G=G2). In this way, the gain value G may decrease in a phased manner (with predetermined steps) as the inclination angle $\theta$ increase.

When the inclination angle $\theta$ from the inclination sensor 45 becomes the predetermined angle $\theta_a$ and the inversion control unit 46b thereby determines that the assisting wheel 27 comes into contact with the ground, it suspends the inversion control by setting the gain value G of the inversion control to zero. In this way, the so-called chattering, which would otherwise occurs between the assisting wheel 27 and the road surface E as the assisting wheel 27 comes into contact with the ground, can be suppressed, and therefore the assisting wheel 27 can be brought into contact with the ground in a more stable manner. Therefore, the safety and the comfort of the traveling devices 10 and 20 can be improved even further.

In traveling device 10, 20 in accordance with the third exemplary embodiment, other structures are roughly the same as those of the traveling devices 10, 20 in accordance with the first and second exemplary embodiments. Therefore, the same signs are assigned to the same parts, and their detailed explanation is omitted.

Figure 9:
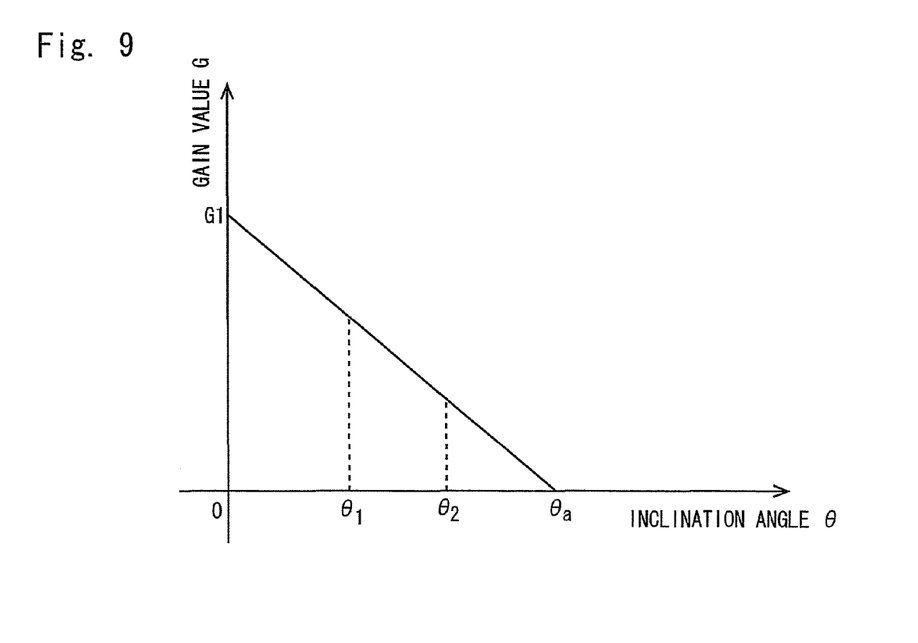
FIG. 9 shows an example of a relation between gain values of inversion control and inclination angles.

Further, although the inversion control unit 46b decreases the gain value G in a phased manner as the inclination angle θ increases, it is not limited to this example and any decreasing method can be used. For example, the gain value G may be decreased linearly (FIG. 9), or decreased to zero immediately when the inclination angle θ becomes equal to $θ_a$.

Figure 10:
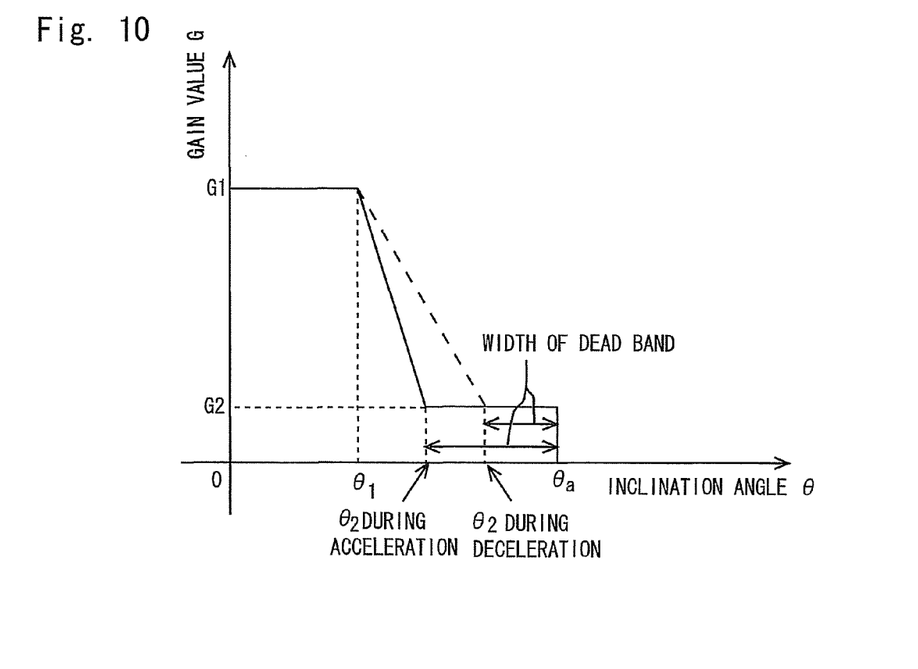
FIG. 10 shows an example of a relation between gain values of inversion control and inclination angles.

Furthermore, in the above-described third exemplary embodiment, the width of the dead band expressed as $θ_2 ≦$ inclination angle $θ<θ_a$ within which the dead band G becomes equal to G2 may be changed according to acceleration/deceleration of the drive wheels 13L and 13R. For example, when the drive wheels 13L and 13R are being accelerated, the width of the dead band expressed as $θ_2 ≦$ inclination angle $θ<θ_a$ may be widened, whereas when the drive wheels 13L and 13R are being decelerated, the width of the dead band expressed as $θ_2 ≦$ inclination angle $θ<θ_a$ may be narrowed (FIG. 10). In this way, the above-mentioned chattering can be suppressed more effectively, and therefore the assisting wheel 27 can be brought into contact with the ground in a more stable manner.

Figure 11:
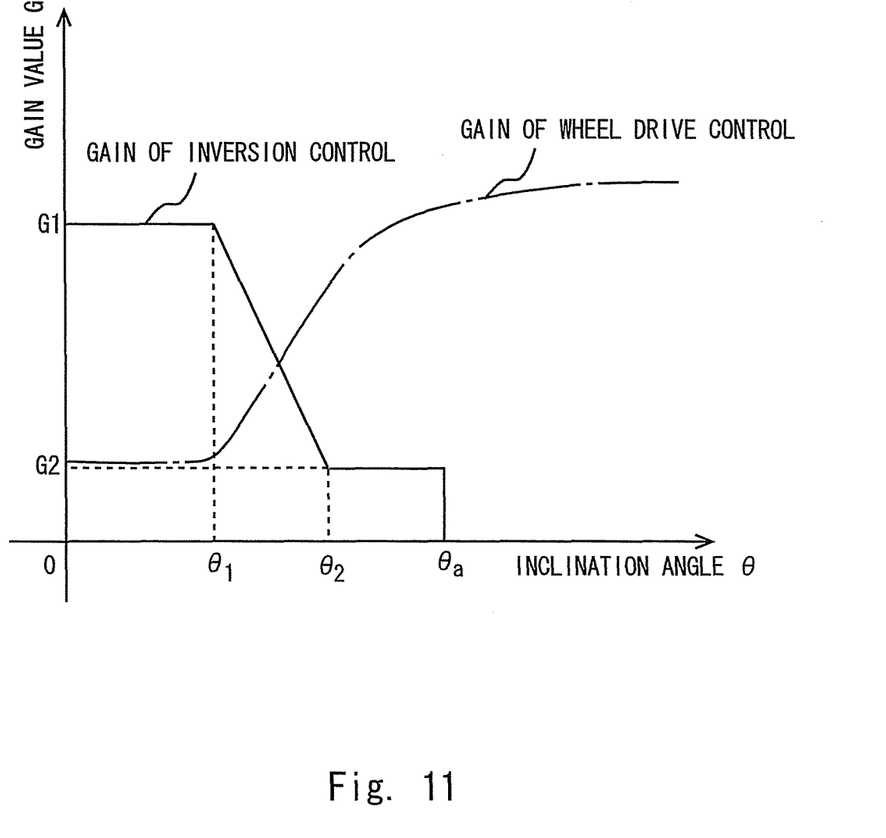
FIG. 11 shows an example of a relation between gain values of inversion control and wheel drive control and inclination angles.

Further, in the above-described third exemplary embodiment, the inversion control unit 46b may increase the gain value G' (dashed dotted line) used to perform drive control (movement control) for the drive wheels 13L and 13R, while decreasing the gain value G (solid line) of the inversion control, according to the inclination angle θ detected by the inclination sensor 45 (FIG. 11).

The inversion control unit 46b increases the gain value G' for the wheel drive control, while decreasing the gain value G of the inversion control, for example, as the inclination angle θ from the inclination sensor 45 gradually increases and thus the assisting wheel 27 gets closer to the road surface E. That is, in the normal traveling state, the inversion control has a higher priority than the wheel drive control in order to reliably prevent the traveling device 10, 20 from tumbling down. Therefore, the gain value G of the inversion control is set to a higher value in comparison to the gain value G' for the wheel drive control. On the other hand, when the inversion control is to be suspended as in the case of this exemplary embodiment, the wheel drive control has, on the contrary, a high priority than the inversion control. Therefore, by increasing the gain value G' of the wheel drive control while decreasing the gain value G of the inversion control as described above, more appropriate control can be performed.

Note that the present invention is not limited to the above-described exemplary embodiments, and various modifications can be made as appropriate without departing from the spirit of the present invention. For example, in the above-described first to third exemplary embodiments, when a malfunction of the equipment, such as the control device 46, 56 and the wheel drive units 14L and 14R, that could have a significant effect on the inversion control is detected, the control device 46, 56 may perform getting-off assist control to help the rider to get off the vehicle in addition to suspending the above-described inversion control. When the control device 46, 56 perform this getting-off assist control, they forcefully tilt the vehicle main body 12 backward, for example, by accelerating the traveling device 10, 20 for a certain time period. In this way, the assisting wheel 27 comes into contact with the ground, and the inversion control unit 46b suspends the inversion control by performing the above-described control process. By doing so, the safety of the traveling device 10, 20 can be improved even further.

Each of the above-described embodiments can be combined as desirable by one of ordinary skill in the art.

The present invention is applicable to, for example, traveling devices that perform inversion control while traveling, such as a coaxial two-wheeled vehicle and a wheelchair type vehicle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling device comprising:
   a vehicle main body;
   a plurality of coaxially arranged drive wheels attached to the body;
   an operation lever extending upwardly from the body; and
   an assisting wheel spaced from the body and extending in direction perpendicular to the axis of the plurality of coaxially arranged drive wheels;
   a braking detection unit to detect start of braking of the vehicle; and
   a control device having a ground detection unit, the control device programmed to:
      detect a ground touching state in which the assisting wheel touches a road surface with the ground touching detection unit; and
      perform inversion control by controlling driving of the plurality of coaxially arranged drive wheels with the control device,
   wherein when start of braking is detected by the braking detection unit and the ground touching state of the assisting wheel is detected by the ground touching detection unit, the control device suspends the inversion control, and
   wherein when the ground touching state of the assisting wheel is detected by the ground touching detection unit, the control device suspends the inversion control.

2. The traveling device according to claim 1, wherein the braking detection unit comprises an inclination sensor that detects an inclination angle of the vehicle, and the braking detection unit detects the start of braking of the vehicle based on the inclination angle of the vehicle detected by the inclination sensor.

3. The traveling device according to claim 1, wherein the braking detection unit comprises a brake switch to start braking, and the braking detection unit detects the start of braking of the vehicle based on an output signal from the brake switch.

4. The traveling device according to claim 1, wherein the ground touching detection unit comprises an inclination sensor that detects an inclination angle of the vehicle, and the ground touching detection unit detects the ground touching state of the assisting wheel when an inclination angle of the vehicle detected by the inclination sensor becomes a first predetermined angle.

5. The traveling device according to claim 1, wherein the ground touching detection unit comprises an inclination sensor that detects an inclination angle of the vehicle, and
the control device suspends the inversion control by changing a gain value of the inversion control according to the inclination angle of the vehicle detected by the inclination sensor.

6. The traveling device according to claim 5, wherein the control device suspends the inversion control by decreasing the gain value of the inversion control as the assisting wheel gets closer to a road surface.

7. The traveling device according to claim 5, wherein a width of a dead band within which the gain value of the inversion control does not change according to the inclination angle of the vehicle is established, and
the control device changes the width of the dead band according to acceleration/deceleration of the traveling device.

8. The traveling device according to claim 5, wherein the control device suspends the inversion control by changing a gain value of wheel drive control according to the inclination angle of the vehicle detected by the inclination sensor.

9. The traveling device according to claim 8, wherein the control device increases the gain value of the wheel drive control and suspends the inversion control as the assisting wheel gets closer to the road surface.

10. The traveling device according to claim 1, wherein the ground touching detection unit comprises a load detection sensor that detects a load exerted on the assisting wheel, and
the ground touching detection unit detects the ground touching state of the assisting wheel based on a load on the assisting wheel detected by the load detection sensor.

11. A control method for a traveling device, the traveling device including a vehicle main body, a control device, a plurality of coaxially arranged drive wheels attached to the body, an operation lever extending upwardly from the body, and an assisting wheel spaced from the body and extending in direction perpendicular to the axis of the plurality of coaxially arranged drive wheels, the method comprising the steps of:
detecting a ground touching state in which the assisting wheel touches a road surface with the ground touching detection unit;
performing inversion control by controlling driving of the plurality of coaxially arranged drive wheels with the control device;
detecting start of braking of the vehicle; and
suspending the inversion control when start of braking is detected and the ground touching state of the assisting wheel is detected,
wherein when the ground touching state of the assisting wheel is detected by the ground touching detection unit, the control device suspends the inversion control.

* * * * *